Figure 1:
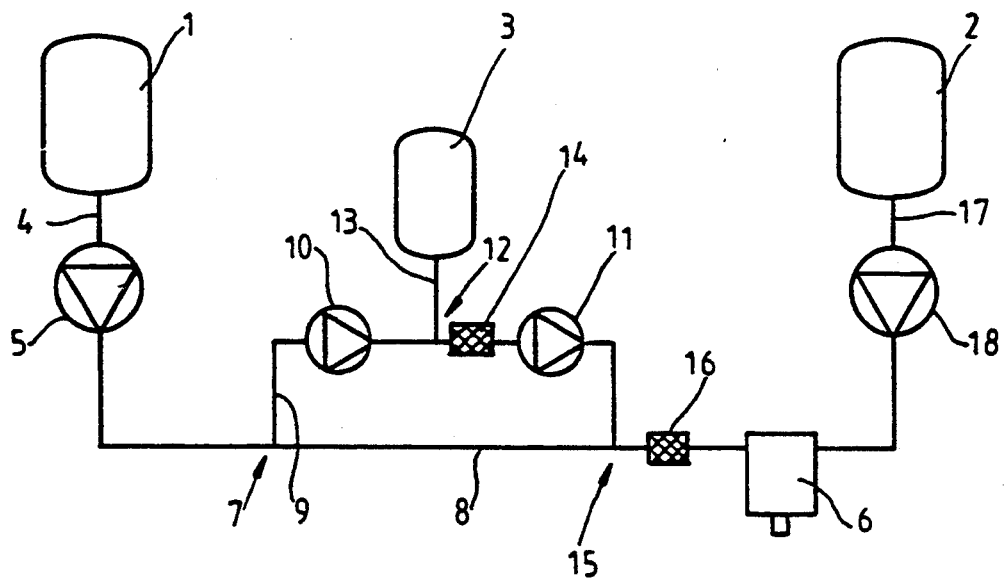

United States Patent [19]

Krippl et al.

[11] Patent Number: 5,382,603
[45] Date of Patent: Jan. 17, 1995

[54] PROCESS AND APPARATUS FOR THE PREPARATION OF A POLYURETHANE REACTION MIXTURE

[75] Inventors: Kurt Krippl, Monheim; Wilfried Ebeling; Jürgen Fietz, both of Cologne; Hans-Michael Sulzbach, Koenigswinter; Reiner Raffel, Siegburg; Ferdinand Althausen, Neunkirchen, all of Germany

[73] Assignee: Bayer Aktiengesellschaft, Leverkusen, Germany

[21] Appl. No.: 117,047

[22] PCT Filed: Feb. 28, 1992

[86] PCT No.: PCT/EP92/00440
§ 371 Date: Sep. 9, 1993
§ 102(e) Date: Sep. 9, 1993

[87] PCT Pub. No.: VO92/16345
PCT Pub. Date: Oct. 1, 1992

[30] Foreign Application Priority Data

Mar. 14, 1991 [DE] Germany .............................. 4108186

[51] Int. Cl.$^6$ ............................................. C08L 75/00
[52] U.S. Cl. ...................................... 521/99; 521/131; 521/133; 528/44; 528/48; 422/135; 366/168; 366/279
[58] Field of Search .......................... 521/99, 131, 133; 528/4.4, 4.8; 422/135; 366/168, 279

[56] References Cited

U.S. PATENT DOCUMENTS 3,230,047  1/1966  Weinbrenner et al. ............... 23/252

FOREIGN PATENT DOCUMENTS 858413   11/1940  France .
2250970   4/1974  Germany .
2836286   2/1980  Germany .
957748    5/1964  United Kingdom .
2126910   4/1984  United Kingdom .

*Primary Examiner*—Maurice J. Welsh
*Attorney, Agent, or Firm*—Joseph C. Gil

[57] ABSTRACT

The variations in the delivery rate of additive caused by fluctuations in a system for the preparation of a polyurethane reaction mixture from flowable reactants and an additive, in particular a blowing agent, are kept within negligible limits by subdividing the supply pipe (4) to the mixing head (6) into a main pipe (8) and a subpipe (9) and introducing the additive into the side stream, which is substantially smaller than the main stream.

10 Claims, 1 Drawing Sheet

PROCESS AND APPARATUS FOR THE PREPARATION OF A POLYURETHANE REACTION MIXTURE

This invention relates to a process and an apparatus for the preparation of a polyurethane reaction mixture from flowable reactants and an additive, in particular a blowing agent, in which the streams of reactants are metered into a mixing zone and the additive is metered into one of the streams of reactants, as disclosed in DE-B-1 153 153 (corresponding to GB-B-957 748).

According to DE-B-1 128 125 (corresponding to US-A-3 230 047), blowing agent is absorbed by a pump and metered into a premixer where it is premixed with the polyol component. Owing to the low viscosity of blowing agents and their low boiling points, such pump systems require high input pressures at the inlet end, but these high pressures cause external leakages into the surroundings. Closed pump systems such as membrane pumps are not suitable owing to their pulsating delivery.

According to DE-B-1 153 153 (corresponding to GB-B-957 748), the procedure may be the same as described above. The apparatus shown there may have a modification (which, however, is not explicitly described there) so that the polyol component is taken in by a fore pump and metered into a premixer into which the blowing agent is also introduced, and the resulting mixture is taken in by a main pump and delivered into a mixing head. If one operated in this manner, fluctuations in pressure in the supply system would cause considerable variations in the quantity of blowing agent delivered so that the mixing ratio would be completely falsified and the properties of the end product would be deleteriously affected.

The problem arises of providing a process and an apparatus with which even small quantities of flowable additives, in particular blowing agents, can be introduced without leakage and in the correct quantity or with only negligible deviations even in the event of pressure fluctuations in the supply system.

To solve this problem, the stream of reactant which is to be charged with additive is subdivided into a main stream and a side stream which is branched off in a measured quantity and the additive is introduced into this metered side stream, and the side stream charged with additive is reunited with the main stream.

The additive is preferably introduced by pump intake together with the reactant of the side stream. Due to the metered introduction of the additive into a side stream, the fluctuations in delivery rate can be kept all the smaller the lower the delivery rate of reactant in the side stream compared with that of the main stream.

According to a particular embodiment of the new process, the delivery rate of reactant in the side stream is therefore kept substantially smaller than that of the main stream, preferably at most 10%.

For the preparation of a polyurethane reaction mixture, the additive is introduced into the more highly viscous polyol component, as is usual, if this additive has a lower viscosity than the polyol, which is generally the case with blowing agents. More highly viscous additives are preferably introduced into the more fluid isocyanate component.

According to a particular embodiment, additive and reactant are homogeneously mixed in the side stream.

According to another embodiment of the process, the side stream charged with additive is homogeneously mixed with the main stream.

This may take place in addition to the homogenisation of the side stream. This preliminary mixing has a favourable effect on the subsequent course of the reaction between the two reactants.

The new apparatus for the preparation of a polyurethane reaction mixture of flowable reactants and an additive, in particular a blowing agent, is based on storage containers for reactants and a storage container for additive with pipes leading from the storage containers for reactants to a mixing head via first dosing pumps and a supply pipe for blowing agent leading from the storage container for additive and opening into the supply pipe for the reactant charged with additive, as disclosed in DE-B-1 153 153 (corresponding to GB-B-957 748).

The novelty is to be seen in the fact that this supply pipe which contains the first dosing pump is branched into a main pipe and a side pipe, that a second dosing pump and a third dosing pump are arranged in the side pipe and the supply pipe for additive opens between this second and third dosing pump, that the third dosing pump has a delivery rate which is higher than that of the second dosing pump by the quantity of blowing agent to be supplied, and that the side pipe rejoins the main pipe downstream of the third dosing pump.

This arrangement enables the delivery rate of additive to be kept substantially constant even in the event of pressure fluctuations in the delivery system or enables deviations in the quantitative ratio to the reactant which is to be charged to be kept negligible. There is no risk of leakages to the outside even when commercially available piston dosing pumps are used since the additives are not delivered on their own but together with the reactant by only one dosing pump. The additional technical expenditure is small compared with the improvement in quality of the end product.

According to one particular embodiment, the output of the second dosing pump is substantially smaller than that of the first delivery pump, preferably amounting to at most 10% of the latter.

According to another particular embodiment of the apparatus, the first dosing pump is arranged in the supply pipe before it branches into the main pipe and the side pipe.

In that case, the first and the second dosing pump are arranged in series and the first dosing pump absorbs the total quantity of reactant required from the storage container which is generally at an inlet pressure of from 2 to 4 bar. The side stream is then separated off from this main stream by means of the second dosing pump arranged in the side pipe, and this side stream is then absorbed together with the additive by the third dosing pump.

Alternatively, the first dosing pump may be arranged in the main pipe.

In that case, the first and the second dosing pump operate in parallel so that the sum of their delivery rates is equal to the total delivery rate of reactant. The mode of operation is otherwise the same as in the first embodiment.

A mixer is preferably arranged in the side pipe behind the opening of the supply pipe for additive.

The additive is thereby homogeneously distributed in the reactant. The mixer may be arranged in front of or behind the third dosing pump.

According to another particular embodiment, a mixer is arranged in the supply pipe for reactant behind the point at which the main pipe is united with the side pipe.

In this case the additive may again be homogeneously distributed in the stream of reactant.

Figure 2:
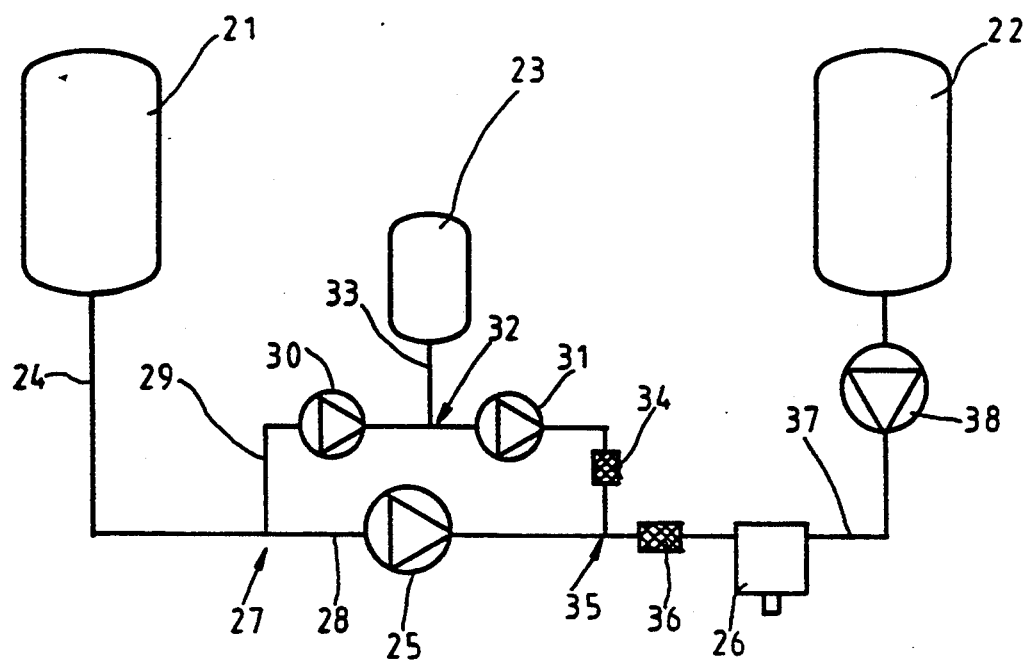

Two exemplary embodiments of the new apparatus are described below with reference to the drawing, which is a purely schematic flow diagram, and in which FIG. 1 shows an apparatus according to the first exemplary embodiment and FIG. 2 shows an apparatus according to the second exemplary embodiment.

In FIG. 1, the apparatus comprises a storage container 1 for polyol as reactant, a storage container 2 for isocyanate as reactant and a storage container 3 for a blowing agent as additive. A supply pipe 4 leads from the storage container 1 to a mixing head 6 by way of a first dosing pump 5. Downstream of the first dosing pump 5, the supply pipe 4 branches at 7 into a main pipe 8 and a side pipe 9. The side pipe 9 contains a second dosing pump 10 and a third dosing pump 11 between which two pumps is the opening 12 of a pipe 13 leading from the storage container 3 for additive. Downstream of the opening 12, a mixer 14 is provided in the side pipe 9. The side pipe 9 and the main pipe 8 rejoin at 15. Downstream of this point, the pipe 4 contains a static mixer 16. A supply pipe 17 leads from the storage container 2 to the mixing head 6 by way of a dosing pump 18.

The apparatus shown in FIG. 2 consists of a storage container 21 for polyol as reactant, a storage container 22 for isocyanate as reactant and a storage container 23 for a blowing agent as additive. A pipe 24 leads from the storage container 21 to a mixing head 26. This pipe branches at 27 into a main pipe 28 and a side pipe 29. A first dosing pump 25 is arranged in the main pipe 28; a second dosing pump 30 and a third dosing pump 31 are provided in the side pipe 29. A pipe 33 leading from the storage container 23 for additive opens into the pipe 29 at 32 between the second and third dosing pump. A mixer 34 is also arranged in the side pipe 29, downstream of the opening 32. The main pipe 28 and the side pipe 29 reunite at 35. A static mixer 36 is provided downstream of the point 35 in the pipe 24. A pipe 37 leads from the storage container 22 to the mixing head 26 by way of a dosing pump 38.

The mode of operation of the apparatus shown in FIG. 1 is as follows: The storage containers 1,2 and 3 are under an inlet pressure of 3 bar. The dosing pump 5 delivers polyol at the rate of 5000 g/min. 150 g/min of this quantity are branched off into the side pipe 9 by the dosing pump 10. The remaining 4850 g/min flow through the main pipe 8. The dosing pump 11 operates at an output rate of 300 g/min so that it takes in 150 g/min of blowing agent in addition to the stream of 150 g/min of component provided by the dosing pump 10. The ratio of polyol to blowing agent is therefore 100 parts by weight to 3 parts by weight. The blowing agent is finely distributed in the polyol in the mixer 14. In the mixer 16, the side stream charged with blowing agent is homogenized with the main stream. The dosing pump 18 delivers 5000 g/min of isocyanate to the mixing head 6. Both delivery systems are under a pressure of 100 bar.

If, for example, a rise in pressure to 120 bar occurs at the polyol side, this is associated with a reduction in delivery rate of about 2%, i.e. dosing pump 5 changes its delivery rate from 5000 to 4900 g/min and dosing pump 11 changes its delivery rate from 300 to 294 g/min. The delivery rate of pump 10 remains constant at 150 g/min as there is no change in its counter pressure. The fall in delivery rate of blowing agent is only 6 g/min, in other words 144 g/min of blowing agent continue to be delivered. The ratio of polyol to blowing agent is 100 parts by weight to 2.94 parts by weight.

The mode of operation of the apparatus shown in FIG. 2 is as follows: The storage containers 21, 22 and 23 are under an inlet pressure of 4 bar. Dosing pump 25 delivers 4850 g/min of polyol through the main pipe 28 and dosing pump 30 delivers 150 g/min of polyol through the side pipe 29. Dosing pump 31 operates at a delivery rate of 300 g/min so that in addition to the stream of component provided by the dosing pump 30 it takes in 150 g/min of blowing agent. The ratio of polyol to blowing agent is therefore 100 parts by weight to 3 parts by weight. The blowing agent is finely distributed in the polyol in the mixer 34. In the mixer 36, the side stream charged with blowing agent is homogenized with the main stream. The dosing pump 38 delivers 5000 g/min of isocyanate to the mixing head 26. Both delivery systems are under a pressure of 100 bar. When a pressure rise to 120 bar occurs at the polyol side, this is associated with a decrease in delivery rate of about 2%. The dosing pump 25 then delivers only 4753 g/min. The dosing pump 30 remains constant at 150 g/min and the dosing pump 31 delivers 294 g/min, i.e. 6 g/min less of blowing agent. The total delivery rate of polyol is 4903 g/min and of blowing agent 144 g/min, i.e. 2.94 parts by weight of blowing agent are delivered for every 100 parts by weight of polyol.

If the apparatus according to DE-B-1 153 153 (corresponding to GB-B-957 748) is employed according to the variation mentioned at the beginning, which has not been described in detail, the stream of polyol of 5000 g/min is supplied with 150 g/min of blowing agent when the mixing pump is adjusted to a delivery rate of 5150 g/min. The system pressure is 100 bar. The ratio of polyol to blowing agent is 100 parts by weight to 3 parts by weight. A rise in pressure to 120 bar is associated with a decrease in delivery rate of 2%, i.e. the mixing pump then delivers only 5047 g/min. The decrease in delivery rate of 103 g/min is entirely at the expense of blowing agent while the polyol continues to be delivered in the correct quantity by the fore pump so that only 47 g/min of blowing agent are now introduced. The ratio of polyol to blowing agent breaks down completely and is only 100 parts by weight to 0.94 parts by weight.

The numerical examples given here in [g/min] apply accurately only if the polyol and the blowing agent have the same specific gravity.

We claim:

1. A process for the preparation of a polyurethane reaction mixture from a first stream of a first flowable reactant, a second stream of a second flowable reactant and an additive, comprising subdividing said first stream into a main stream and a side stream, introducing said additive into said side stream, reuniting said side stream containing said additive with said main stream, and metering said main stream and said second stream into a mixing zone.

2. The process of claim 1, wherein the flow rate of reactant in said side stream is kept substantially smaller than the flow rate of reactant in said main stream.

3. The process of claim 1, wherein said additive and reactant are homogeneously mixed in said side stream.

4. The process of claim 1, wherein said side stream is homogeneously mixed with said main stream.

5. An apparatus for the preparation of a polyurethane reaction mixture from at least two streams of flowable reactants and an additive, consisting of
   a) a first storage container for a first flowable reactant,
   b) a second storage container for a second flowable reactant,
   c) a third storage container for said additive,
   d) a first supply pipe leading from said first container to a mixing head via a first dosing pump,
   e) a second supply pipe leading from said second container to said mixing head via a second dosing pump,
   f) a side pipe branching off from said second supply pipe and leading back to said second supply pipe via a third and fourth dosing pump,
   g) a third supply pipe leading from said third container and opening into said side pipe between said third and fourth dosing pumps.

6. The apparatus of claim 5, wherein the output of the third dosing pump is substantially smaller than that of the second dosing pump.

7. The apparatus of claim 5, wherein the second dosing pump is arranged in the second supply pipe upstream of the point where the side pipe branches off.

8. The apparatus of claim 5, wherein the second dosing pump is arranged in the second supply pipe downstream of the point where the side pipe branches off and upstream of the point where the side pipe is reconnected to said second supply pipe.

9. The apparatus of claim 5, wherein a mixer is arranged in the side pipe downstream of the opening from said third supply pipe.

10. The apparatus of claim 5, wherein a mixer is arranged in said second supply pipe downstream of the point where said side pipe is reunited with said second supply pipe.

* * * * *